US008844026B2

(12) United States Patent
Truskovsky et al.

(10) Patent No.: US 8,844,026 B2
(45) Date of Patent: Sep. 23, 2014

(54) SYSTEM AND METHOD FOR CONTROLLING ACCESS TO SECURE RESOURCES

(75) Inventors: Alexander Truskovsky, Waterloo (CA); Neil Patrick Adams, Waterloo (CA); Alexander Sherkin, Woodbridge (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/486,145

(22) Filed: Jun. 1, 2012

(65) Prior Publication Data

US 2013/0326614 A1     Dec. 5, 2013

(51) Int. Cl.
*G06F 12/00*     (2006.01)
*G06F 17/30*     (2006.01)

(52) U.S. Cl.
USPC ............... 726/19; 726/3; 726/10; 713/168

(58) Field of Classification Search
CPC ........ G06F 21/31; G06F 21/83; G06F 21/575
See application file for complete search history.

(56) References Cited

U.S. PATENT DOCUMENTS

| | | | |
|---|---|---|---|
| 6,243,816 B1 | 6/2001 | Fang et al. | |
| 6,263,432 B1 | 7/2001 | Sasmazel et al. | |
| 6,308,274 B1 * | 10/2001 | Swift | 726/9 |
| 6,854,056 B1 | 2/2005 | Benantar et al. | |
| 7,107,456 B2 | 9/2006 | Baldwin et al. | |
| 7,107,610 B2 | 9/2006 | Lortz | |
| 7,225,330 B2 | 5/2007 | Brownell et al. | |
| 7,725,710 B2 * | 5/2010 | Kelly et al. | 713/156 |
| 7,802,294 B2 * | 9/2010 | Perlin et al. | 726/9 |
| 7,805,755 B2 | 9/2010 | Brown et al. | |
| 7,913,314 B2 | 3/2011 | Orthlieb et al. | |
| 7,975,312 B2 | 7/2011 | Broderson et al. | |
| 7,978,856 B2 | 7/2011 | Cho et al. | |

(Continued)

FOREIGN PATENT DOCUMENTS

| EP | 1380916 | 1/2001 |
|---|---|---|
| EP | 2096569 | 4/2012 |

(Continued)

OTHER PUBLICATIONS

Thorsteinson, Peter et al., ".NET Security and Cryptography", Prentice Hall, Aug. 18, 2003.

(Continued)

*Primary Examiner* — Fikremariam A Yalew
(74) *Attorney, Agent, or Firm* — Bereskin & Parr LLP/S.E.N.C.R.L., s.r.l.

(57) ABSTRACT

A system and method for controlling access to a secure resource in a device are disclosed. In some embodiments, the device may include a processor capable of receiving a first request from a first application of a plurality of applications executable by the processor, where the first request requests access to the secure resource, and the first request identifies the plurality of applications. In response to the first request, the processor is capable of generating a ticket associated with the secure resource and with each of the plurality of applications, and then storing the ticket in a memory. After receiving a second request from a second application requesting access to the secure resource, the processor is capable of granting the second application access to the secure resource, if the ticket associated with the secure resource exists and if the ticket is associated with the second application.

16 Claims, 12 Drawing Sheets

(56) References Cited

U.S. PATENT DOCUMENTS

| | | |
|---|---|---|
| 7,984,513 B1 | 7/2011 | Kyne et al. |
| 7,984,514 B1 | 7/2011 | Meketa |
| 8,060,751 B2 | 11/2011 | Kitaj et al. |
| 2001/0009026 A1* | 7/2001 | Terao et al. ............ 713/170 |
| 2003/0134615 A1 | 7/2003 | Takeuchi |
| 2003/0144991 A1 | 7/2003 | Arrouye et al. |
| 2003/0163376 A1 | 8/2003 | Inoue et al. |
| 2004/0010701 A1 | 1/2004 | Umebayashi et al. |
| 2004/0078565 A1 | 4/2004 | Hofmeister et al. |
| 2004/0236938 A1 | 11/2004 | Callaghan |
| 2005/0005112 A1* | 1/2005 | Someren ............ 713/167 |
| 2007/0067836 A1 | 3/2007 | Busboom et al. |
| 2009/0031430 A1 | 1/2009 | Ward et al. |
| 2009/0222903 A1 | 9/2009 | Sherkin et al. |
| 2010/0082491 A1* | 4/2010 | Rosenblatt et al. ........ 705/65 |
| 2010/0211995 A1* | 8/2010 | Yoshida ................ 726/4 |
| 2010/0251340 A1 | 9/2010 | Martin et al. |
| 2010/0293388 A1 | 11/2010 | Ammer et al. |
| 2011/0030047 A1* | 2/2011 | Gao et al. ............. 726/9 |
| 2011/0055593 A1 | 3/2011 | Lurey et al. |
| 2011/0296515 A1* | 12/2011 | Krstic et al. ........... 726/10 |
| 2012/0144202 A1* | 6/2012 | Counterman ........... 713/176 |
| 2012/0179907 A1* | 7/2012 | Byrd et al. ............ 713/156 |

FOREIGN PATENT DOCUMENTS

| | | |
|---|---|---|
| EP | 2670105 | 12/2013 |
| WO | 01/06701 | 1/2001 |
| WO | 02/31778 | 4/2002 |
| WO | 2005/106675 | 11/2005 |

OTHER PUBLICATIONS

Mitchell, Mark et al., "Advanced Linux Programming", Jun. 11, 2001.

Microsoft Computer Dictionary, Fifth Edition, Definitions: program, process and thread, Microsoft Press, May 1, 2002.

Microsoft Windows CE 3.0 Operating System Configurations, 2000 Microsoft Corporation. Retrieved from the Internet: http://msdn.microsoft.com/en-us/library/ms834357.aspx.

Office Action. U.S. Appl. No. 10/996,406, now issued as U.S. Patent No. 7,805,755. Dated: Nov. 9, 2007.

Amendment. U.S. Appl. No. 10/996,406, now issued as U.S. Patent No. 7,805,755. Dated: May 9, 2008.

Final Office Action. U.S. Appl. No. 10/996,406, now issued as U.S. Patent No. 7,805,755. Dated: Aug. 19, 2008.

Request for Continued Examination (RCE) and Amendment. U.S. Appl. No. 10/996,406, now issued as U.S. Patent No. 7,805,755. Dated: Feb. 19, 2009.

Office Action. U.S. Appl. No. 10/996,406, now issued as U.S. Patent No. 7,805,755. Dated: Apr. 30, 2009.

Amendment. U.S. Appl. No. 10/996,406, now issued as U.S. Patent No. 7,805,755. Dated: Jul. 30, 2009.

Office Action. U.S. Appl. No. 10/996,406, now issued as U.S. Patent No. 7,805,755. Dated: Nov. 12, 2009.

Response. U.S. Appl. No. 10/996,406, now issued as U.S. Patent No. 7,805,755. Dated: Mar. 11, 2010.

Notice of Allowance. U.S. Appl. No. 10/996,406, now issued as U.S. Patent No. 7,805,755. Dated: Jun. 10, 2010.

Extended European Search Report. European Patent Application No. 12170607.1. Dated: Oct. 10, 2012.

Response. European Patent Application No. 12170607.1. Dated: Jun. 26, 2013.

Prosecution Documents for U.S. Appl. No. 10/996,406, issued to Patent No. 7,805,755 on Sep. 28, 2010.

Communication under Rule 71(3) EPC. European Patent Application No. 12170607.1. Dated: Jun. 25, 2014.

* cited by examiner

SYSTEM AND METHOD FOR CONTROLLING ACCESS TO SECURE RESOURCES

FIELD

The present disclosure relates generally to computing and communication devices and in particular to controlling access to secure resources on a device.

INTRODUCTION

Modern computing and communication devices, such as laptops and mobile phones, are being configured with an increasing number of applications. In some cases, it may be desirable to provide some of those applications with access to secure resources on the device such as cryptographic keys (e.g. symmetric keys and asymmetric keys), secure files and secure data folders. To this end, a device may be configured to prompt a user for a password whenever an application requests access to a secure resource.

DRAWINGS

For a better understanding of the described embodiments and to show more clearly how they may be carried into effect, reference will now be made, by way of example, to the accompanying drawings in which.

DESCRIPTION OF VARIOUS EMBODIMENTS

In one broad aspect, there is provided a system and a method for controlling access to a secure resource in a device, the device comprising a processor and a memory, wherein the processor is capable of: receiving a first request from a first application of a plurality of applications executable by the processor, the first request requesting access to the secure resource, and the first request identifying the plurality of applications; in response to the first request, generating a ticket associated with the secure resource and with each of the plurality of applications; storing the ticket in the memory; receiving a second request from a second application of the plurality of applications, the second request requesting access to the secure resource; and after receiving the second request, granting the second application access to the secure resource in response to determining that the ticket associated with the secure resource exists and that the ticket is associated with the second application.

In another broad aspect, the processor receives a password before granting the second application access to the secure resource, via a user interface, in response to a prompt requesting the password.

In another broad aspect, the processor is capable of displaying the prompt on a display communicably coupled to the processor.

In another broad aspect, generating the ticket further comprises: generating a message authentication code (MAC) for the ticket using a key, an application identifier associated with the plurality of applications, and a secure resource identifier.

In another broad aspect, generating the ticket further comprises signing the ticket or data therein using a digital signature algorithm.

In another broad aspect, the ticket is time-limited and is configured to expire; and the processor determines that the ticket has not expired before granting the second application access to the secure resource.

In another broad aspect, the processor determines that each one of the plurality of applications is signed by a key associated with a same developer certificate before generating the ticket.

In another broad aspect, the secure resource comprises at least one of: a key in a keystore, a data file, or a secure data folder.

In another broad aspect, the device comprises a mobile device.

Figure 1:
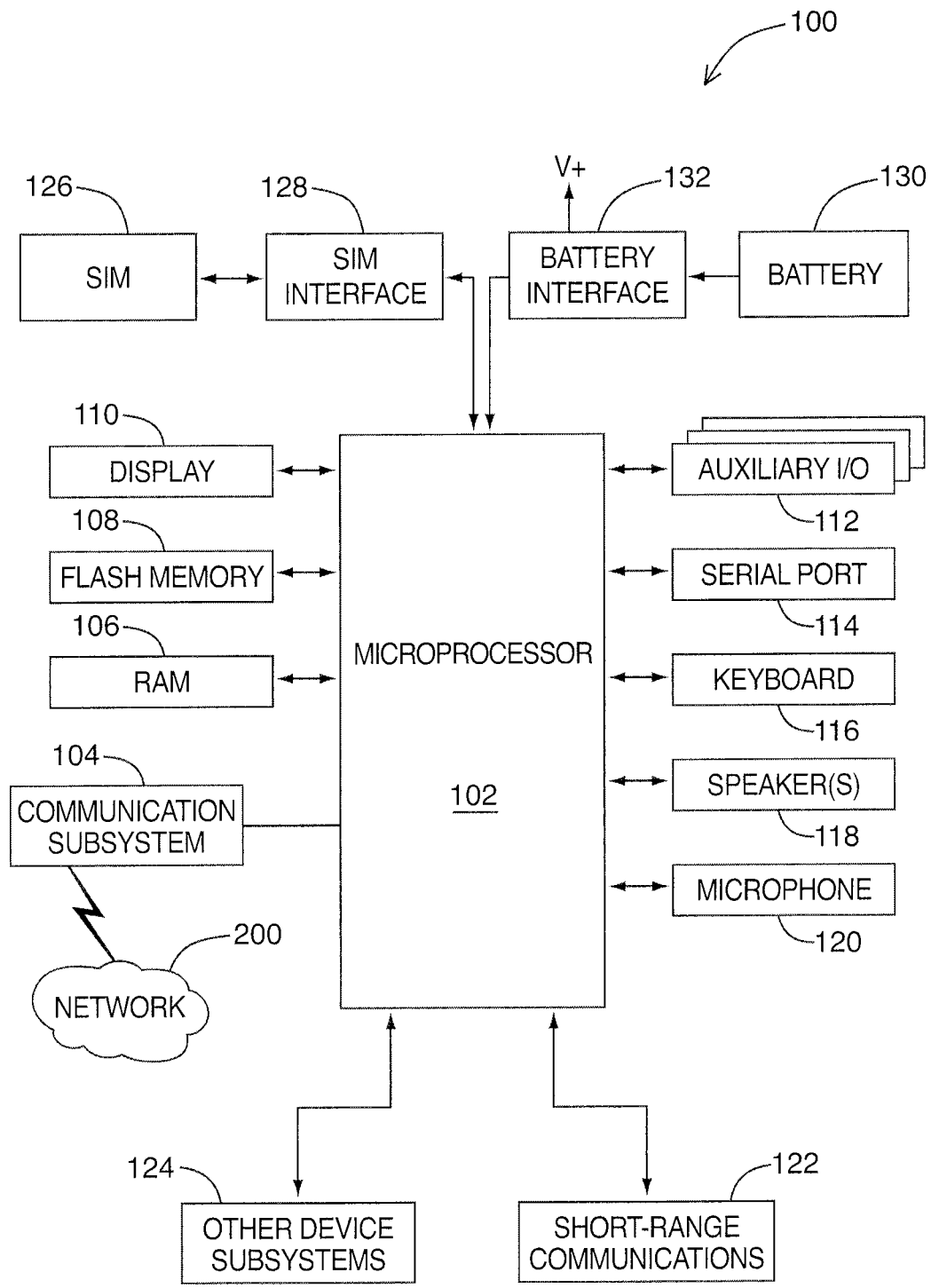
FIG. 1 is a block diagram of a mobile device in one example implementation.
Figure 2:
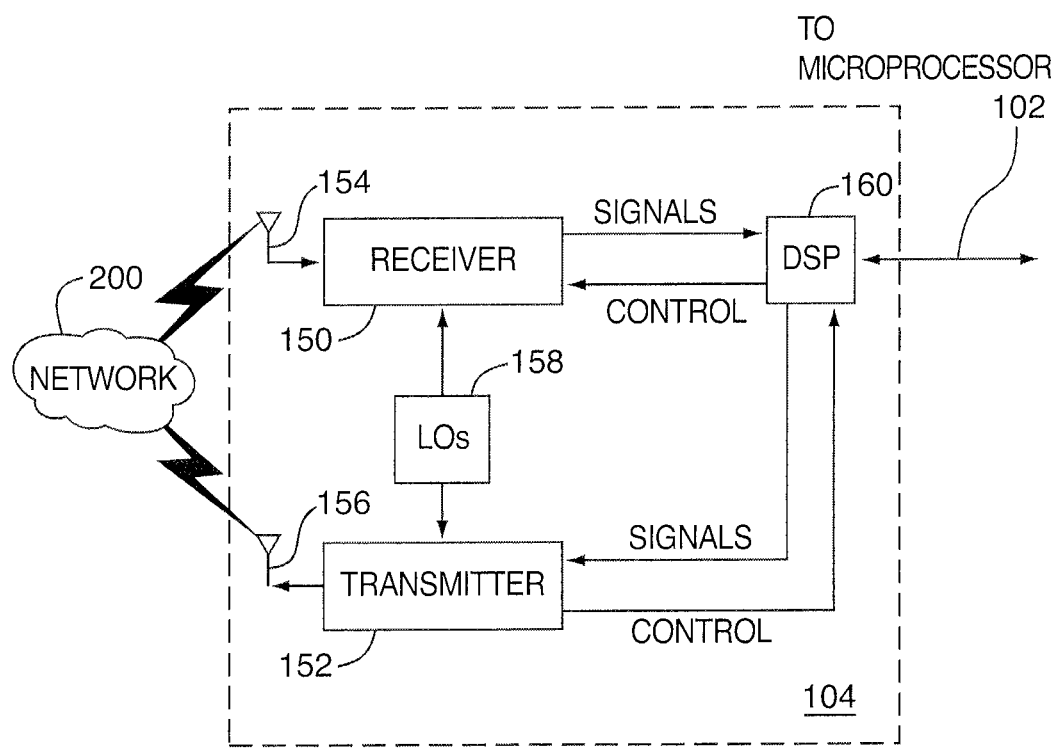
FIG. 2 is a block diagram of a communication sub-system component of the mobile device of FIG. 1.
Figure 3:
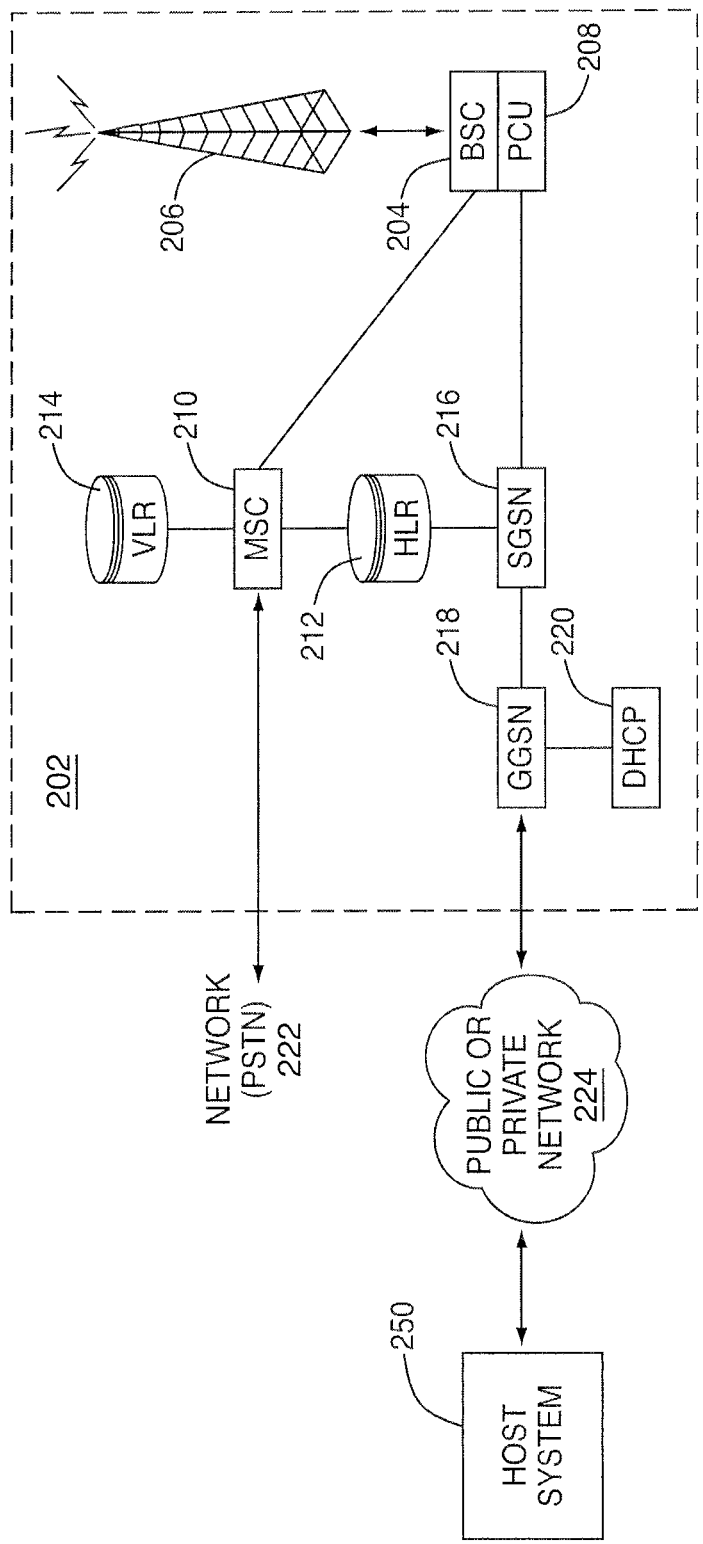
FIG. 3 is a block diagram of a node of a wireless network in one example implementation.

Reference is first made to FIGS. 1 to 3 for a general description of an example structure of a mobile device and how the mobile device operates and communicates with other devices. The mobile device (sometimes referred to alternatively as a "mobile station" or "portable electronic device") may comprise a two-way communication device with advanced data communication capabilities having the capability to communicate with other computer systems and devices. The mobile device may include the capability for voice communications, data communications or a combination of the two. Depending on the functionality provided by the mobile device, it may be referred to as a smartphone, a data messaging device, a two-way pager, a cellular telephone with data messaging capabilities, a wireless Internet appliance, a laptop computer, a tablet computer, a media player (such as an MP3 player), an electronic book reader or a data communication device (with or without telephony capabilities). Although a mobile device is described herein by way of illustration, embodiments described herein may be applicable to other computing devices other than mobile devices. For example, embodiments described herein may be applied to other computing platforms that control access to secure resources in variant implementations.

Referring now to FIG. 1 specifically, a block diagram of a mobile device in one example implementation is shown generally as 100. Mobile device 100 comprises a number of components, the controlling component being microprocessor 102. Microprocessor 102 controls the overall operation of mobile device 100. In some embodiments, certain communication functions, including data and voice communications, are performed through communication subsystem 104. Communication subsystem 104 receives messages from and sends messages to a wireless network 200.

In this example implementation of mobile device 100, communication subsystem 104 may be configured for cellular communication in accordance with the Global System for Mobile Communication (GSM) and General Packet Radio Services (GPRS) standards. The GSM/GPRS wireless network is used worldwide and it is expected that other standards such as Enhanced Data GSM Environment (EDGE) and Universal Mobile Telecommunications Service (UMTS) may be employed. These standards are mentioned as examples only, and other standards may be employed on computing devices to which embodiments described herein are applied.

New standards are still being defined, but it is believed that they will have similarities to the network behavior described herein, and it will also be understood by persons skilled in the art that the described embodiments are intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

The wireless network associated with mobile device 100 may comprise a GSM/GPRS wireless network in one example implementation of mobile device 100; however, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and n-generation (e.g. 2.5G, 3G, 3.5G, 4G, etc.) networks like EDGE, UMTS, High-Speed Downlink Packet Access (HSDPA), High-Speed Uplink Packet Access (HSUPA), High-Speed Packet Access (HSPA), and Long Term Evolution (LTE), etc. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, one or more speakers 118, microphone 120, short-range communication subsystem 122 and other device subsystems 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator, media player or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications (illustrated as applications 402 in FIG. 4, below), or parts thereof, may be temporarily loaded into a volatile store such as RAM 106.

In some embodiments, mobile device 100 may send and receive communication signals over network 200 after required network registration or activation procedures have been completed. Network access is associated with a subscriber or user of a mobile device 100. To identify a subscriber, mobile device 100 may require a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things.

By inserting SIM 126 into SIM interface 128, a subscriber can access subscribed services. Services could include: web browsing and messaging such as e-mail, voice mail, Short Message Service (SMS), media transfers (such as music downloading or streaming), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that subscribers are not necessarily bound by any single physical mobile device. SIM 126 may store additional subscriber information for a mobile device as well, including datebook (or calendar) information and recent call information. In certain embodiments SIM 126 may be a different type of user identifier and may be integral to mobile device 100 or not present at all. By way of further examples, a Universal Integrated Circuit Card (UICC), eUICC (Embedded UICC), Removable User Identity Module (R-UIM), CDMA Subscriber Identity Module (CSIM), or Universal Subscriber Identity Module (USIM) may be employed.

Mobile device 100 typically includes a power pack that supplies power to electronic components and that supports portability. The power pack may be of any type, but by way of illustration, it will be assumed that mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed in flash memory 108 (or other non-volatile storage) on mobile device 100 during its manufacture.

Additional applications may also be loaded onto mobile device 100 through network 200, auxiliary I/O subsystem 112, serial port 114, short-range communications subsystem 122, or the other device subsystems 124. This flexibility in application installation increases the functionality of mobile device 100 and may provide enhanced on-device functions, communication-related functions, or both. For example, secure communication applications may enable electronic commerce functions and other such financial transactions to be performed using mobile device 100. Numerous other types of applications may be loaded onto mobile device 100 or other computing devices, including without limitation, messaging applications (e.g. e-mail, text, instant, video, etc.), voice communication applications, calendar applications, address book applications, utility applications, browser applications, media player (e.g. audio, video, etc.) applications, social network applications, camera applications, gaming applications, productivity applications, etc.

Serial port 114 enables a subscriber to set preferences through an external device or software application and may extend the capabilities of mobile device 100 by providing for information or software downloads to mobile device 100 other than through a wireless communication network. The alternate download path may, for example, be used to load an encryption key onto mobile device 100 through a direct and more reliable and trusted connection to provide secure device communication.

It should be noted that the term "download" and forms thereof as used herein, in the specification and in the claims, are used generally to describe a transfer of data from one system to another, and is not intended to be limiting with regards to the origin or destination of the transfer, for example. Accordingly, where the term "download" and forms thereof are used in the specification and in the claims, it is intended to encompass other forms of transfers including, for example, an "upload" or a "sideload" of data (e.g. a Universal Serial Bus (USB) sideload).

Short-range communications subsystem 122 provides for wireless device connections to enable communication between mobile device 100 and different systems or devices, generally without the use of network 200. For example, subsystem 122 may include an infrared device and associated circuits and components for short-range communication. Examples of short range communication would include standards developed by the Infrared Data Association (IrDA), Near Field Communication (NFC), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary I/O subsystem 112 may include devices such as: a touch screen, mouse, infrared fingerprint detector, or a roller wheel with a dynamic button pressing capability. Further, auxiliary I/O subsystem 112 may comprise a two-dimensional navigation (or scrolling) component, such as a track ball, a joystick or a directional pad, each optionally with a dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to the one or more speakers 118, and signals for transmission would be generated by microphone 120. Alternative voice or audio I/O subsystems, such as a voice message recording subsystem, may also be implemented on mobile device 100. Although voice or other audio signal output is accomplished primarily through the one or more speakers 118, display 110 may also be used to provide additional information such as the identity of a calling party, duration of a voice call, or other voice call related information. Microphone 120 can receive a supply of power, in the form of a bias voltage and bias current, from the rechargeable battery 130. Different types and configurations of microphone 120 can be incorporated into the mobile device 100.

Referring now to FIG. 2 specifically, a block diagram of the communication subsystem 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but generally also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3 specifically, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through example network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224

(also referred to herein generally as a shared network infrastructure) represents the data path for GPRS capable mobile devices. In a GSM network extended with GPRS capabilities, BSC 204 may also contain a Packet Control Unit (PCU) 208 that connects to SGSN 216, to control segmentation, radio channel allocation and to satisfy packet switched requirements. To track mobile device location and availability for both circuit switched and packet switched management, HLR 212 is typically shared between MSC 210 and SGSN 216. Access to VLR 214 may be controlled by MSC 210.

Station 206 is generally a fixed transceiver station. Station 206 and BSC 204 together form the fixed transceiver equipment. The fixed transceiver equipment provides wireless network coverage for a particular coverage area commonly referred to as a "cell". The fixed transceiver equipment generally transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further, VLR 214 may also contain information on mobile devices that are visiting other networks. The information in VLR 214 typically includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This feature is not present in circuit switched voice channels as Integrated Services Digital Network (ISDN) addresses are used for routing incoming and outgoing calls. Currently, GPRS capable networks typically use private, dynamically assigned IP addresses, and a DHCP server 220 connected to the GGSN 218. There are many mechanisms for dynamic IP assignment, including using a combination of a Remote Authentication Dial-In User Service (RADIUS) server and DHCP server.

Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs, and mobile devices 100 typically cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are generally a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

The public or private network 224 may also provide access to a host system 250.

Figure 4:
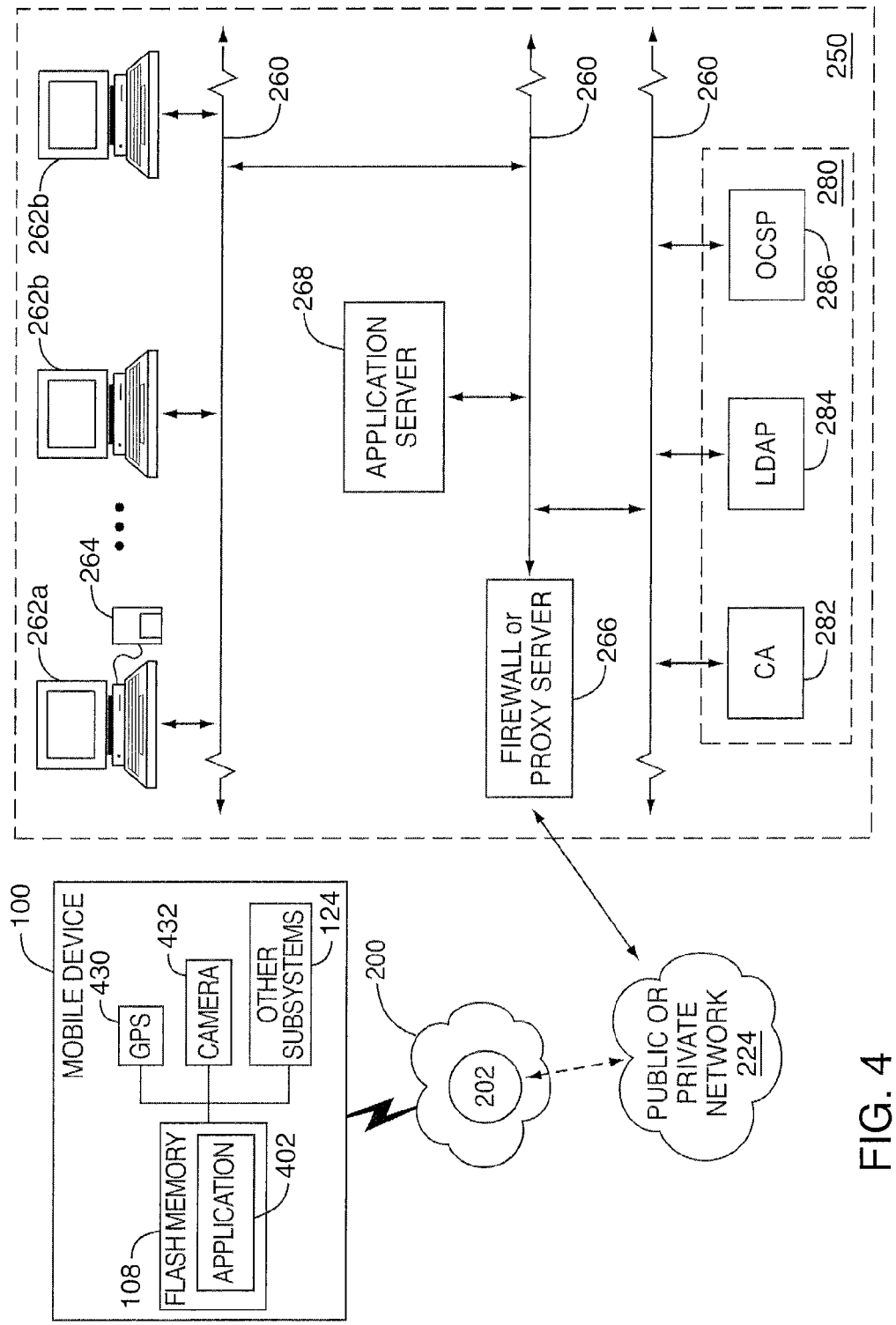
FIG. 4 is a block diagram illustrating components of a host system in one example configuration.

Referring now to FIG. 4, a block diagram illustrating components of a host system in one example configuration is shown. Host system 250 will typically be a corporate office or other local area network (LAN), but may instead be a home office computer or some other private system, for example, in variant implementations. In this example shown in FIG. 4, host system 250 is depicted as a LAN of an organization to which a user of mobile device 100 belongs.

LAN 250 comprises a number of network components connected to each other by LAN connections 260. For instance, a user's desktop computer 262a with an accompanying cradle 264 for the user's mobile device 100 is situated on LAN 250. Cradle 264 for mobile device 100 may be coupled to computer 262a by a serial or a USB connection, for example. Other user computers 262b are also situated on LAN 250, and each may or may not be equipped with an accompanying cradle 264 for a mobile device. Cradle 264 facilitates the loading of information (e.g. PIM data, private symmetric encryption keys to facilitate secure communications between mobile device 100 and LAN 250) from user computer 262a to mobile device 100, and may be particularly useful for bulk information updates often performed in initializing mobile device 100 for use. The information downloaded to mobile device 100 may include certificates used in the exchange of messages. It will be understood by persons skilled in the art that user computers 262a, 262b will typically be also connected to other peripheral devices not explicitly shown in FIG. 4.

Embodiments described herein relate generally to control of applications (e.g. 402). Accordingly, only a subset of network components of LAN 250 are shown in FIG. 4 for ease of exposition, and it will be understood by persons skilled in the art that LAN 250 will comprise additional components not explicitly shown in FIG. 4, for this example configuration. More generally, LAN 250 may represent a smaller part of a larger network [not shown] of the organization, and may comprise different components and/or be arranged in different topologies than that shown in the example of FIG. 4.

In this example, mobile device 100 communicates with LAN 250 through a node 202 of wireless network 200 and a shared network infrastructure 224 such as a service provider network or the public Internet. Access to LAN 250 may be provided through one or more routers [not shown], and computing devices of LAN 250 may operate from behind a firewall or proxy server 266.

In a variant implementation, LAN 250 comprises a wireless VPN router [not shown] to facilitate data exchange between the LAN 250 and mobile device 100. The concept of a wireless VPN router is relatively new in the wireless industry and implies that a VPN connection can be established directly through a specific wireless network to mobile device 100. A VPN connection may be a Transmission Control Protocol (TCP)/IP or User Datagram Protocol (UDP)/IP connection to deliver the messages directly to mobile device 100 for example.

Many secure communication protocols rely on public and private encryption keys to provide confidentiality and integrity, and on a Public Key Infrastructure (PKI) to communicate information that provides authentication and authorization. Data encoded using a private key of a private key/public key pair can only be decoded using the corresponding public key of the pair, and data encoded using a public key of a private key/public key pair can only be decoded using the corresponding private key of the pair. Private key information is not intended to be made public, whereas public key information is typically shared.

For example, if a sender wishes to send a message to a recipient in encrypted form, the recipient's public key is used to encrypt a message, which can then be decrypted only using the recipient's private key. Alternatively, in some encoding techniques, a one-time session key is generated and used to encrypt the body of a message, typically with a symmetric encryption technique (e.g. Triple DES). The session key is then encrypted using the recipient's public key (e.g. with a public key encryption algorithm such as RSA), which can then be decrypted only using the recipient's private key. The decrypted session key can then be used to decrypt the message body. The message header may be used to specify the particular encryption scheme that is to be used to decrypt the message. Other encryption techniques based on public key cryptography may be used in variant implementations. However, in each of these cases, only the recipient's private key may be used to facilitate decryption of the message, and in this way, the confidentiality of messages can be maintained.

As a further example, a sender may sign a message using digital signature techniques. Generating a digital signature generally involves generating a digest of the message (e.g. a hash of the message), and using the sender's private key; the resulting signature can then be appended to the outgoing message. The recipient uses the same technique as the sender (e.g. using the same standard hash algorithm) to obtain a digest of the received message. The recipient also uses the sender's public key to verify the digital signature, in order to obtain what should be a matching digest for the received message. If the digests of the received message do not match, this suggests that either the message content was changed during transport and/or the message did not originate from the sender whose public key was used for verification. By verifying a digital signature in this way, authentication of the sender and message integrity can be maintained.

An encoded message may be encrypted, signed, or both encrypted and signed. The authenticity of public keys used in these operations is validated using certificates. A certificate is a digital document issued by a certificate authority (CA). Certificates are used to authenticate the association between users and their public keys, and essentially, provides a level of trust in the authenticity of the users' public keys. Certificates contain information about the certificate holder, with certificate contents typically formatted in accordance with an accepted standard (e.g. X.509).

For a public key to be trusted, its issuing organization must be trusted. The relationship between a trusted CA and a user's public key can be represented by a series of related certificates, also referred to as a certificate chain. The certificate chain can be followed to determine the validity of a certificate.

Certificate servers store information about certificates and lists identifying certificates that have been revoked. These certificate servers can be accessed to obtain certificates and to verify certificate authenticity and revocation status. For example, a Lightweight Directory Access Protocol (LDAP) server may be used to obtain certificates, and an Online Certificate Status Protocol (OCSP) server may be used to verify certificate revocation status.

User computers 262a, 262b can obtain certificates from a number of sources, for storage on computers 262a, 262b and/or mobile devices (e.g. mobile device 100). These certificate sources may be private (e.g. dedicated for use within an organization) or public, may reside locally or remotely, and may be accessible from within an organization's private network or through the Internet, for example. In the example shown in FIG. 4, multiple PKI servers 280 associated with the organization may reside on LAN 250. PKI servers 280 may include a CA server 282 for issuing certificates, an LDAP server 284 used to search for and download certificates (e.g. for individuals within the organization), and an OCSP server 286 used to verify the revocation status of certificates.

Certificates may be retrieved from LDAP server 284 by a user computer 262a, for example, to be downloaded to mobile device 100 via cradle 264. However, in a variant implementation, LDAP server 284 may be accessed directly (i.e. "over the air" in this context) by mobile device 100, and mobile device 100 may search for and retrieve individual certificates through a mobile data server 288. Similarly, mobile data server 288 may be adapted to allow mobile device 100 to directly query OCSP server 286 to verify the revocation status of certificates.

In variant implementations, only selected PKI servers 280 may be made accessible to mobile devices (e.g. allowing certificates to be downloaded only from a user's computer 262a, 262b, while allowing the revocation status of certificates to be checked from mobile device 100).

In variant implementations, certain PKI servers 280 may be made accessible only to mobile devices registered to particular users, as specified by an IT administrator, possibly in accordance with an IT policy, for example.

Other sources of certificates [not shown] may include a Windows certificate store, another secure certificate store on or outside LAN 250, and smart cards, for example.

Applications 402 executable on a mobile device 100 may be stored on an application server 268. Application server 268 may have an application database [not shown] that stores applications 402 for download and execution on the mobile device 100. To have access to the applications 402 stored on the application server 268, each user may have a user account managed by the application server 268. Access to the application server 268 may be provided via a client application operating on mobile device 100, although in variant embodiments, access to the application server may be provided through a web browser, for example.

As illustrated, the application server 268 may comprise an internal network server of the host system 250 used to store applications 402 to be deployed to the organization's mobile devices 100. In a variant embodiment, the application server 268 may additionally or alternatively provide an application store or application market that is accessible from the mobile device 100. The application store may allow users of a mobile device 100 to search for, purchase, and download applications 402 to their mobile device 100. In some embodiments, the application server 268 may reside outside of the host system 250, on a remote system accessible via the public or private network 224, for example.

For ease of understanding the described embodiments related to application control, FIG. 4 further illustrates a simplified view of a subset of components of the mobile device 100 described above. The mobile device 100 may run software applications 402 (sometimes referred to simply as "apps") that access computing resources on the mobile device 100. Applications may be stored in the flash memory 108 of the mobile device 100 or other persistent store, and may access computing resources available on the mobile device 100 when executed. Access may be in the form of the applications invoking application programming interfaces (APIs) made available by the OS to access the computing resources, for example.

Computing resources may be associated with a hardware component (e.g., sensors, radios, or peripherals described above) or a software module (e.g., ones that provide access to data or communication buses described above), and may be made accessible to the application 402 via an API provided by the operating system (OS) of the mobile device 100. For example, the mobile device 100 may allow applications to access a GPS subsystem 430 that is capable of determining the physical location of the mobile device 100, or a camera subsystem 432 that is capable of capturing photographs or video. Other accessible resources may include access to software functionality (e.g., encryption services) or data (e.g., phone book entries) available on the mobile device 100, for example.

An installation manifest [not explicitly shown in FIG. 4] that identifies the computing resources that an application 402 may access when the application is executed on mobile device 100, may be associated with the application 402. Accordingly, when a given computing resource is identified in an installation manifest associated with an application, the user can expect that computing resource to be accessed by the application, though not necessarily in every instance when the application executes. Conversely, when the installation manifest associated with the application fails to identify the computing resource as a resource that the application will access on the computing device when the application is executed, then the application is not typically expected to access the computing resource.

The installation manifest may be uploaded with the application 402 to the application server 268 from a developer device by the application developer. The installation manifest may be stored with the application 402 on the application server 268, and subsequently provided with an application being downloaded to mobile device 100.

A software or application developer creating the application may include the installation manifest in an application manifest that describes the application 402, which may be specifically formatted for the operating system (OS) that the application 402 is intended to be executed on. The application manifest may be stored in an XML format, for example.

Figure 5A:
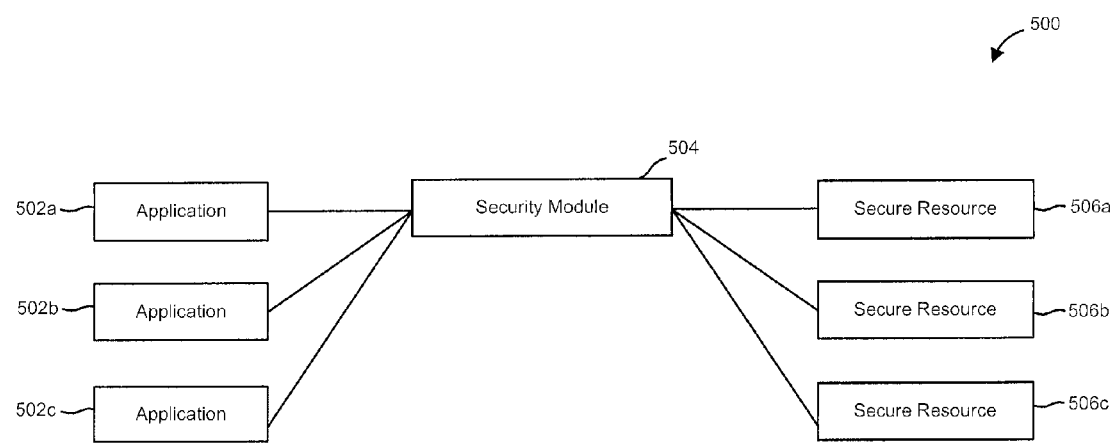
FIG. 5a is a block diagram of a system for controlling access to secure resources on a device in accordance with at least one embodiment.

FIG. 5a shows a block diagram of a system 500 for controlling access to secure resources in a device such as mobile device 100 described above. System 500 comprises a plurality of applications in the form of one or more modules of computer readable instructions each of which is stored in a memory of the device, such as memory 106 or 108, and executable by a processor of the device, such as processor 102.

In the example shown, system 500 comprises three applications 502. By way of illustration, in the Figures, individual instances of applications 502 are labeled as 502a, 502b, 502c, etc. In general, system 500 may comprise fewer than or greater than three applications. Each of applications 502a-c may represent any application executable by the device. For example, applications 502a-c may comprise one or more of a mail client, a word processor, a document viewer, a multimedia viewer, a web browser, a mapping application, or a video game.

Each application 502a-c may request access to one or more secure resources during its execution. A secure resource may comprise any resource to which access is restricted. In some cases, a secure resource may comprise one or more keys in a key store, secure data files or secure data locations (e.g. file folders), or combinations thereof. For example, a mail client may request access to a secure resource, such as one or more cryptographic keys in a key store to encrypt, sign, decrypt or verify one or more email messages. In another example, a document viewer may request access to a secure resource such as a secure data folder, or more generally a secure data location, in which documents to be viewed are stored. In still another example, a video game may request access to a secure resource such as a personal documents folder for storing, accessing and modifying saved-game files. In yet another example, a mapping application may request access to a secure resource such as GPS data provided by a GPS module executing on the device.

In accordance with some embodiments, one or more security modules may control access to the secure resources on a device. In the example shown, a security module 504 controls access to each of the secure resources 506. In some figures, individual instances of a security module 504 may be labeled as 504a, 504b, 504c, etc. Access to a secure resource 506 may be restricted, and access may be granted or denied on a function-by-function basis. For example, the security module 504 may permit an application to view the secure resource 506, copy the secure resource 506, move the secure resource 506, delete the secure resource 506, rename the secure resource 506, print the secure resource 506, or edit the secure resource 506, or any combination thereof.

The security module 504 may use tickets as a mechanism for controlling access to the secure resources 506. In general, a ticket may be in the form of a token or a packet of data that may be issued for authorization purposes. The data in the ticket may identify to certain devices or processing components that a particular operation has been authorized by the ticket's issuer, for example. Generally, an application 502 may send to a security module 504 a request requesting access to a secure resource 506. In response, the security module 504 may prompt a user for authorization to grant the application 502 the requested access. If the user grants authorization, the security module 504 may generate a ticket associated with the application 502 and with the secure resource 506, and grant the application 502 the requested access.

The application 502 may include (or refer to) this ticket in subsequent requests. When the security module 504 receives a request including the ticket, the security module 504 may grant the requested access without re-prompting a user for authorization. In this way, the ticket may serve as a proxy for a user's authorization. Also, the ticket may be reused multiple times. Accordingly, using tickets as a mechanism for controlling access to secure resources 506 may conveniently reduce the number of prompts for authorization.

A ticket may be configured to be valid only for requests from an application 502 that is specifically associated with the ticket. Also, a ticket may be configured to only be valid for requests requesting access to secure resources 506 that are associated with the ticket. Accordingly, when a security module 504 receives a request including a ticket, the security module may verify the validity of the ticket before granting the requested access. For example, the security module 504 may verify that the requesting application 502 is associated with the ticket, and verify that the requested secure resources 506 are associated with the ticket. If the ticket is not associated with the requesting application 502, or if the ticket is not associated with the requested secure resources 506, then the security module 504 may deny the request.

In some embodiments, a ticket may comprise an organized parcel of information. For example, a ticket may comprise information formatted according to a specification such as Extensible Markup Language (XML), HyperText Markup Language (HTML), Comma Separated Values (CSV) or another custom specification. A ticket may be in the form of a discrete file, or a ticket may be an instance of a class, for example.

As previously noted, a ticket may be associated with one or more applications 502 and with one or more secure resources 506. For example, a ticket formatted according to XML may comprise elements to identify a plurality of applications 502 and to identify a plurality of secure resources 506, as in the following simplified example:

```
<?xml version="1.0" encoding="UTF-8" ?>
<applications>
    <id>20</id>
    <id>22</id> </applications>
<secureResources>
    <id>6</id>
    <id>8</id> </secureResources>
```

A ticket comprising the above XML code would be associated with an application associated with application identifier (ID) 20, and with an application associated with application ID 22. An 'Application ID' as specified in an application manifest may be used for the application ID 20, 22. Alternatively, a specified 'process ID' may be used. The ticket would also be associated with a secure resource associated with secure resource ID 6, and with a secure resource associated with secure resource ID 8.

As described in further detail below, security module 504 may be configured to receive requests from applications 502 for access to one or more of secure resources 506. For example, security module 504 may provide an Application Programming Interface (API) for receiving requests to access a secure resource 506 (e.g. an application may call a request access function: RequestAccess(appID, resourceID, ticket)).

When the security module 504 receives a request from an application requesting access to a specific secure resource 506, the security module 504 may determine whether the request comprises a valid ticket. For example, the security module may determine whether the request includes a ticket that is associated with the requesting application 502 and associated with the requested secure resource 506.

If the security module 504 determines that the request does not comprise a valid ticket, then the security module 504 may initiate a procedure for generating a ticket. Generally, the procedure for generating a ticket may comprise prompting a user for manual authorization to grant the requesting application the requested access. After the security module 504 generates the ticket, the security module 504 may issue the ticket to the application 502 that made the request. This allows the application 502 to present the ticket to the security module 504 in subsequent requests for access to the requested secure resources 506. When the security module 504 receives a subsequent request, and the request includes the ticket, the security module 504 may grant the requested access automatically, without prompting a user for authorization. This may conveniently reduce the number of prompts for manual user authorization.

Figure 5B:
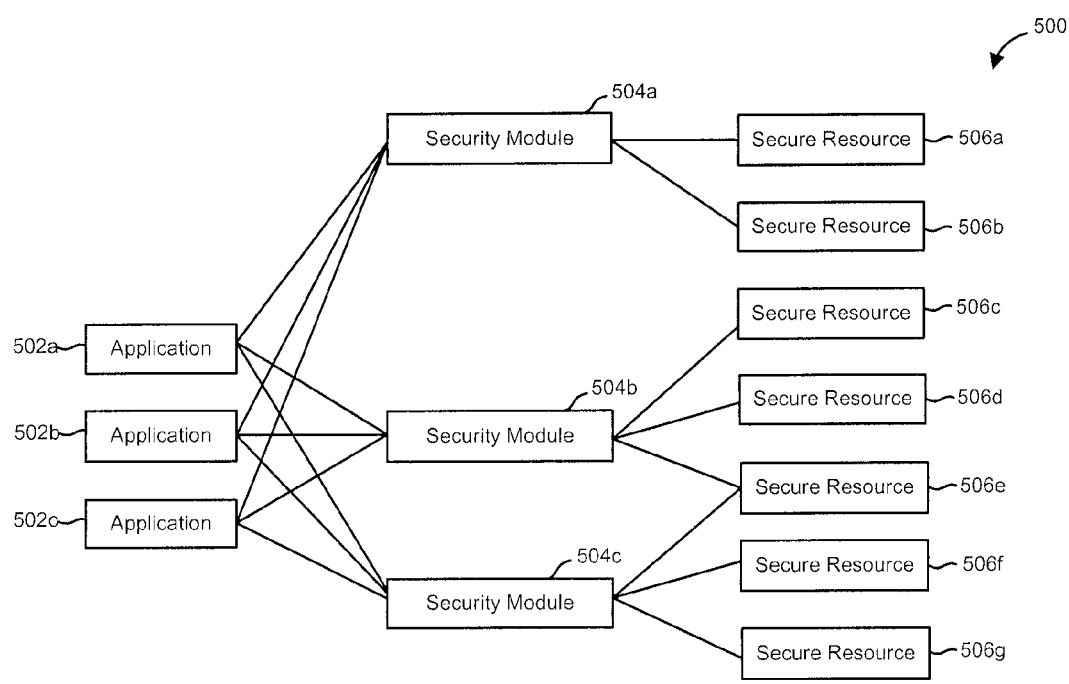
FIG. 5b is a block diagram of a system for controlling access to secure resources on a device in accordance with at least one embodiment.

According to some embodiments, system 500 may comprise a single security module 504 which governs access to all secure resources 506 in the device, as in FIG. 5a. In variant embodiments, as shown in FIG. 5b for example, system 500 may comprise a plurality of security modules 504a-c, each of which controls access to some of the secure resources 506a-g. For example, access to secure resources 506a and 506b may be controlled by security module 504a but may not be controlled by security modules 504b or 504c. Also, a ticket associated with secure resources 506a and 506b may be generated by security module 504a but not by security modules 504b or 504c.

A security module 504 may be configured to control access to certain resources, to generate tickets associated with certain resources, or both. In some embodiments, a security module 504 may be capable of only generating a ticket associated with some secure resources 506, while being capable of granting access to different secure resources 506. For example, security module 504a may be capable of generating tickets associated with secure resources 506a or 506b but may not be capable of generating tickets associated with any of secure resources 506c-g. Similarly, security module 504b may be capable of generating tickets associated with secure resources 506c-e but may not be capable of generating tickets associated with any of secure resources 506a, 506b, 506f or 506g. However, each of security modules 504a, 504b and 504c may be capable of granting access to secure resources 506a-g upon the receipt of a request that includes a valid ticket. Therefore, an application 502 may submit a request for access to secure resources 506 to any of security modules 504a-c. This can result in reduced program logic and thus reduced processing time.

For example, application 502a may send a request to security module 504a, requesting access to secure resource 506a. The security module 504a may determine that the request did not comprise a valid ticket (e.g. the request did not comprise a ticket that is associated with both application 502a and secure resource 506a). Following the determination, security module 504a may generate a ticket that is associated with both secure resource 506a and application 502a. Subsequently, application 502a may send a request to security module 504b, the request including the ticket and the request requesting access to secure resource 506a. Even though security module 504b may not be capable of generating a ticket associated with secure resource 506a, security module 504b may be capable of checking the validity of the ticket (e.g. determining that the ticket is associated with the requested secure resource 506a and with the requesting application 502a) and capable of granting access to the secure resource 506a. In this example, the security module 504b may validate the ticket and grant application 502a access to the secure resource 506a.

Enabling a security module 504 to generate tickets associated with only some secure resources 506 and enabling the same security module 504 to grant access to different secure resources 506 may provide a balance between convenience and security. In some embodiments, by limiting the generation of tickets to a single security module 504 (or a subset of security modules 504), the conditions for generating such tickets may be better controlled. For example, each security module 504 may be configured to generate and issue tickets according to different policies. For example, security module 504a may require a user of the device to enter a password in response to a prompt before it will generate a ticket. By contrast, security module 504b may require a user to provide a fingerprint scan before it will generate a ticket. In this example, access to secure resources 506a and 506b may be subject to less stringent security protocols than the security protocols that control access to secure resources 506c-e.

In some embodiments, more than one security module 504 may control access to a secure resource 506. For example, in FIG. 5b, access to secure resource 506e is controlled by security modules 504b and 504c. As explained above, in some embodiments, security modules 504b and 504c may be capable of generating tickets associated with secure resource 506e while security module 504a may not be capable of generating tickets associated with secure resource 506e. Also, in some embodiments, security modules 504b and 504c may be capable of granting access to secure resource 506e upon the receipt of a valid ticket (e.g. one that is associated with both the requesting application 502 and with the requested secure resource 506e) while security module 504a may not be capable of granting access to secure resource 506e. In some embodiments, each of security modules 504a-c may be capable of granting access to secure resource 506e (upon the receipt of a valid ticket) even though security module 504a may not be capable of generating tickets associated with secure resource 506e.

Figure 5C:
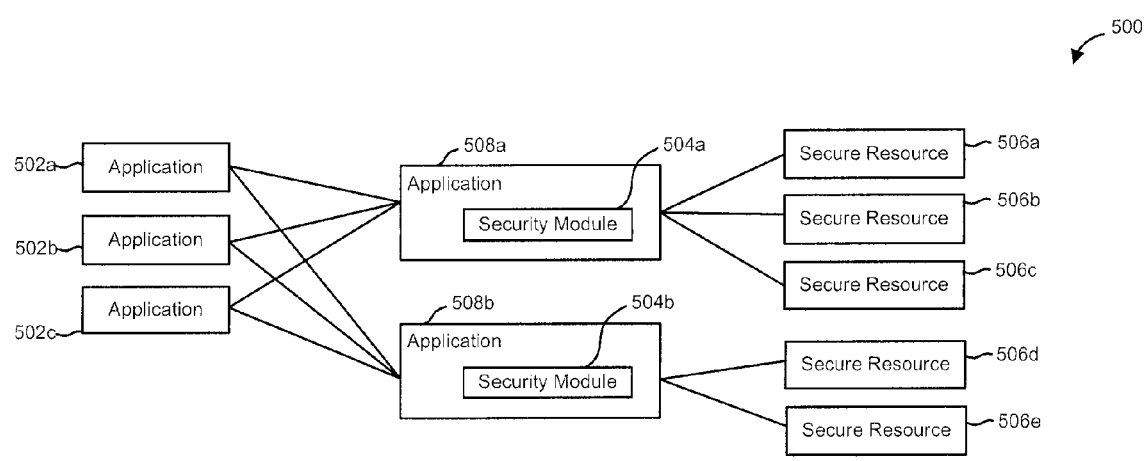
FIG. 5c is a block diagram of a system for controlling access to secure resources on a device in accordance with at least one embodiment.
Figure 5D:
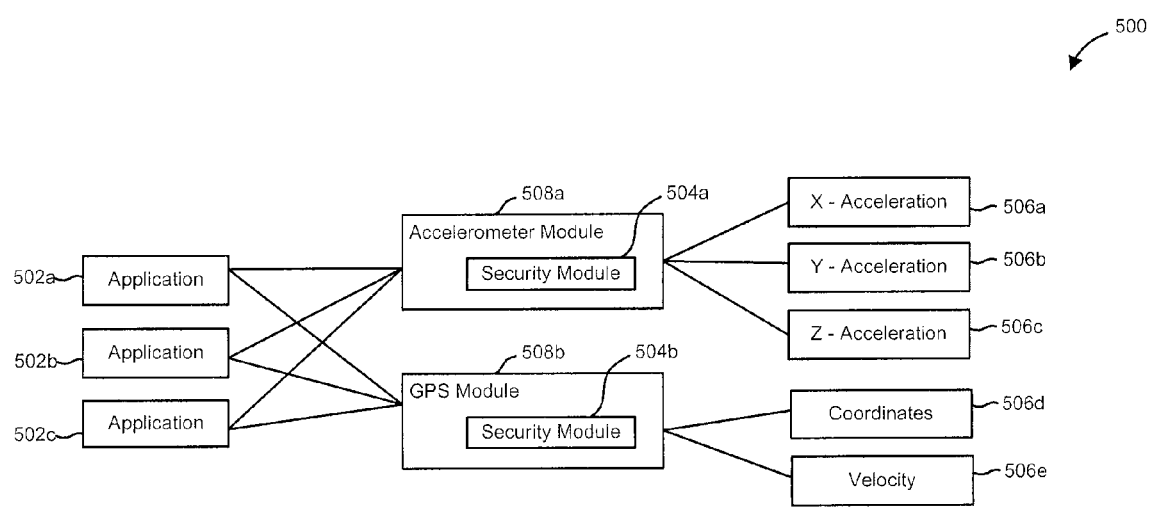
FIG. 5d is a block diagram of a system for controlling access to secure resources on a device in accordance with at least one embodiment.

FIG. 5c illustrates another embodiment of system 500 for controlling access to secure resources. In the example shown, system 500 comprises applications 508, each of which comprises a security module 504. A given application 508 may be configured to control access to secure resources 506 typically associated with that application 508. For example, FIG. 5d shows a system 500 for controlling access to secure resources 506a-e, the system comprising an accelerometer module 508a comprising a security module 504a. The accelerometer module 508a controls access to data comprising accelerometer readings (secure resources) 506a-c. System 500 also comprises a GPS module 508b comprising a security module 504b. The GPS module 508b controls access to GPS data comprising the GPS coordinates 506d and velocity readings 506e, for example.

In the examples of FIGS. 5c and 5d, applications 508 may be configured to receive requests from other applications 502 (for access to secure resources 506), and to redirect those requests to their respective security module 504. In response, security module 504 may return an indication that access to the requested secure resources 506 should be granted to the requesting application 502 (e.g. because the request included a valid ticket). Alternatively, or in addition, the security module 504 receiving the access request may generate and return a ticket (e.g. associated with the requesting application 502 and associated with the requested secure resource 506) for issuance to the requesting application 502.

When a security module 504 generates a ticket associated with a requesting application 502 and associated with secure resources 506, the ticket may be presumed to be valid (for that application 502 to access those secure resources 506) at that moment. Accordingly, when security module 504 generates a ticket and application 508 issues the ticket to an application 502, application 508 may concurrently grant the application 502 access to the requested resources 506 without having the security module 504 validate the ticket. This feature may eliminate a redundant ticket validation thus improving the speed and efficiency of the system.

Figure 5E:
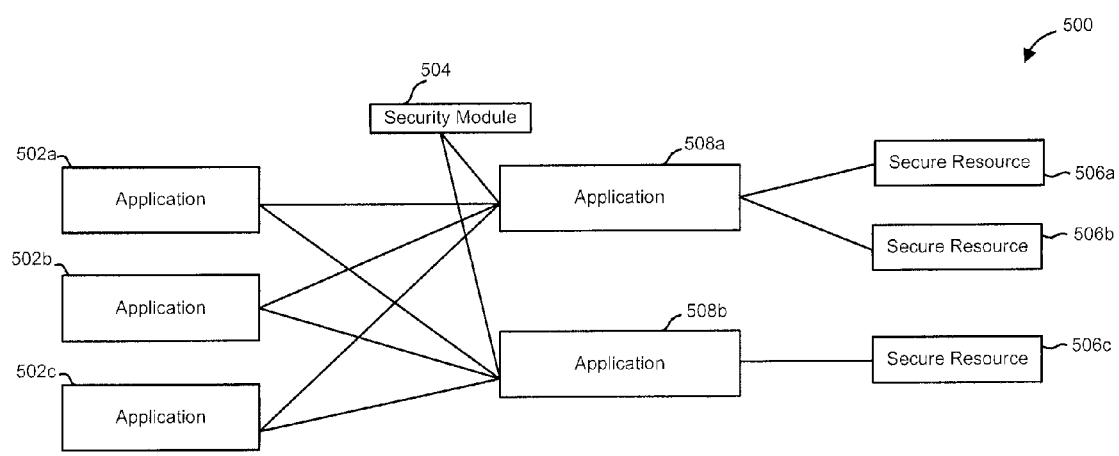
FIG. 5e is a block diagram of a system for controlling access to secure resources on a device in accordance with at least one embodiment.

FIG. 5e shows another embodiment of system 500 comprising applications 508a and 508b and one security module 504. Generally, in this example the applications 508 may perform ticket validation and control access to secure resources 506. The security module 504 may perform ticket generation. Security module 504 may receive requests from a plurality of applications 508 requesting one or more tickets.

In the example shown, application 508a controls access to secure resources 506a and 506b. Application 508b controls access to secure resource 506c. Each application 508 may be configured to receive requests from applications 502 for access to secure resource(s) 506. Applications 508 may be capable of determining the validity of a ticket accompanying a request (e.g. determining whether the ticket is associated with both the requesting application 502 and the requested secure resource(s) 506). If the application 508 determines that the ticket is not valid, then the application 508 may send a request to security module 504 for security module 504 to generate a ticket.

In the example shown, two applications 508a and 508b are configured to send ticket generation requests to the same security module 504. This may permit ticket generation to be performed according to a security policy that applies to multiple applications 508. For example, security module 504 may follow a security policy that requires a user of the device to enter a password before a ticket will be generated. In this example, this security policy can be set once and apply equally to ticket generation requests originating from either of application 508a or application 508b. This may help to unify security policies regarding access to secure resources 506. This may also help to reduce the amount of configuration required to set and update access control policies for the secure resources 506.

Figure 5F:
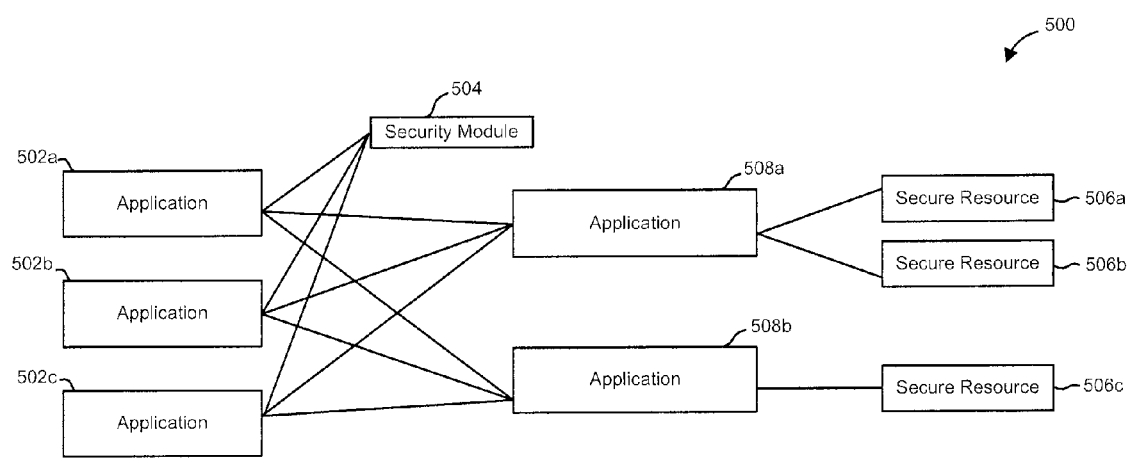
FIG. 5f is a block diagram of a system for controlling access to secure resources on a device in accordance with at least one embodiment.

FIG. 5f shows another embodiment of system 500 comprising applications 508a and 508b and one security module 504. The embodiment shown in FIG. 5f is similar to the embodiment shown in FIG. 5e with a few exceptions. Generally, in this example the applications 508 may perform ticket validation and control access to secure resources 506. The security module 504 may perform ticket generation. Security module 504 may receive requests from a plurality of applications 502 requesting one or more tickets.

In the example shown, an application 502 may send a request, including a ticket, to an application 508 requesting access to one or more secure resources 506. If the application 508 determines that the ticket is not valid, then the application 508 may send an indication to the requesting application 502 indicating that the ticket is not valid. In response to the indication that the ticket is not valid, the requesting application 502 may send a request to security module 504 requesting a ticket that is associated with both the requesting application 502 and with the requested secure resources 506. If the security module 504 generates a ticket and issues the ticket to the requesting application 502, then the requesting application 502 may send a new request to the application 508 for access to the secure resources 506. The new request may comprise the issued ticket. The application 508 may validate the ticket and grant the requesting application 502 access to the requested secure resources 506.

Figure 6A:
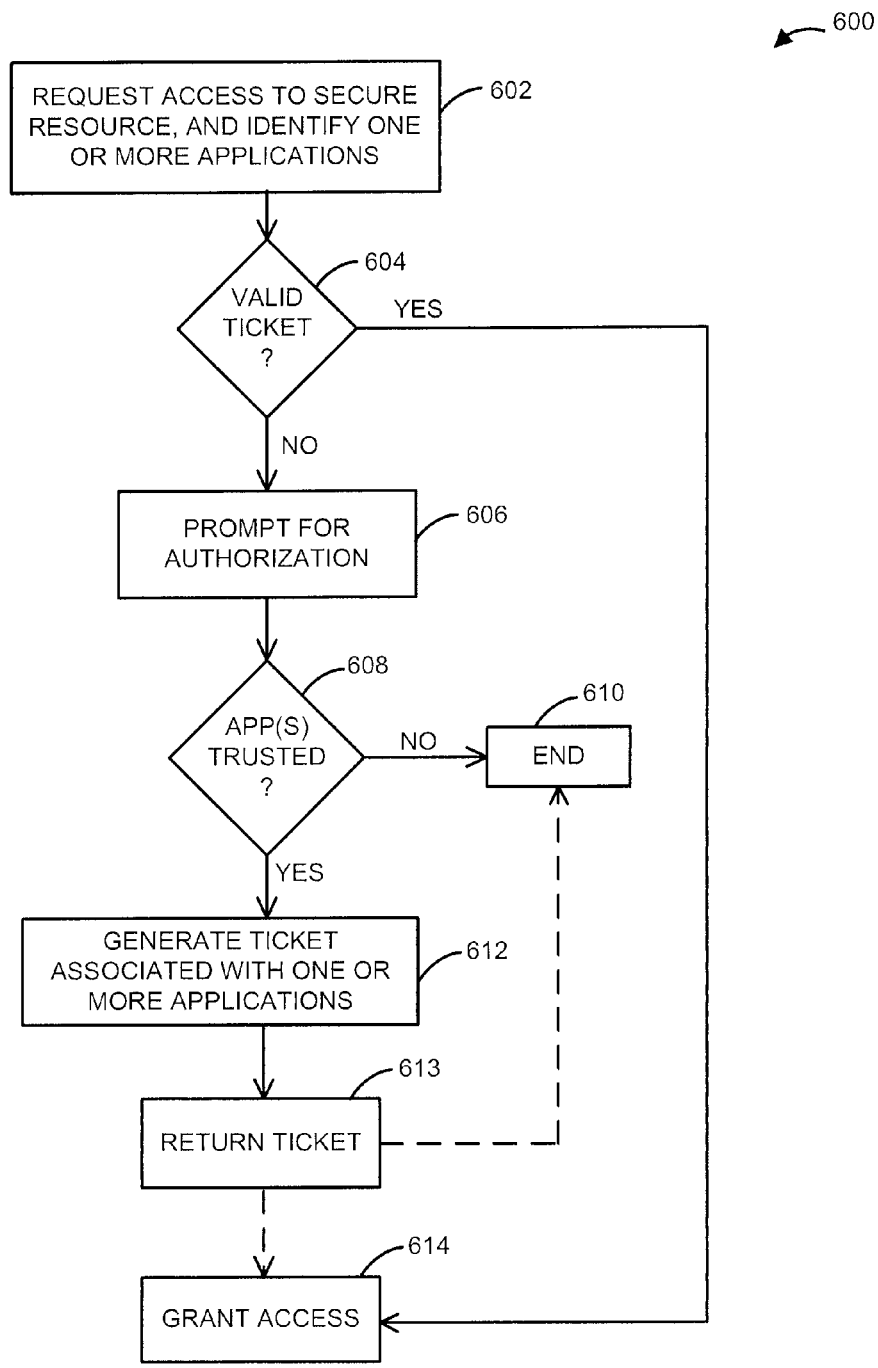
FIG. 6a is a flow diagram of a method of controlling access to secure resources on a device in accordance with at least one embodiment.

FIG. 6a is a flow diagram illustrating acts of a method 600 for controlling access to secure resources on a device, in accordance with at least one example embodiment. In some cases, one or more of the acts of method 600 may be performed by a processor of a device, such as mobile device 100, executing computer readable instructions stored in a memory of the device.

At 602, an application 502 submits a request for access to one or more secure resources 506. In some embodiments, the application 502 may submit the request directly to a security module 504 (e.g. as shown in system 500 of FIGS. 5a and 5b). In some embodiments, the application 502 may submit the request to an application 508, where application 508 controls access to the requested secure resources 506 (e.g. as shown in system 500 of FIGS. 5c, 5d, 5e and 5f). In some embodiments, a plurality of security modules 504 and a plurality of applications 508 may each control access to a different subset of the requested secure resources 506. In this case, the application 502 may submit the request to each of the security modules 504 and to each of the applications 508.

In some embodiments, the request at 602 may comprise an application identifier that identifies the requesting application 502. The request may also comprise one or more secure resource identifiers that identify the one or more secure resources 506. For example, in the case of an application 502 requesting access to a subset of keys 506 in a keystore, the request may comprise the application's AppID, and a KeyID for each key (or some SubsetID for a defined subset of keys).

In some embodiments, none, some or all of the application identifiers and the secure resource identifiers may be unique identifiers. For example, applications and secure resources may be assigned identifiers that are sequentially numbered. The number assignment may be such that the same number is typically never assigned twice. In some embodiments, an identifier may be quasi-unique. For example, applications and secure resources may be assigned identifiers that are randomly generated. A number generator may generate identifiers from among such a large number of possible identifiers that it may be highly improbable for the same identifier to be generated twice. In some embodiments, an application identifier may be a hash of the application 502 itself. Similarly, a secure resource identifier may be a hash of the secure resource 506 itself.

In some embodiments, an identifier may be unique in context. For example, applications may be assigned sequentially numbered identifiers that are unique among application identifiers. Also, secure resources may be assigned sequentially numbered identifiers that are unique among secure resource identifiers. However, there may be some application identifiers that have the same index as certain secure resource identifiers.

In some embodiments, an identifier may not be unique. For example, the same secure resource identifier may be associated with a plurality of secure resources. For example, a secure resource "A" may be identified by a secure resource identifier "1" in requests from a first application. In contrast, the secure resource "B" may be identified by the same secure resource identifier "1" in requests from a second application. When a security module receives an access request, it may determine the requested secure resource is secure resource "A" or "B" using both the application identifier and the secure resource identifier. That is, even though secure resource identifier "1" may be associated with both secure resources "A" and "B", secure resource identifier "1" in requests from the first application may be associated with secure resource "A" exclusively. Similarly, secure resource identifier "1" in requests from the second application may be associated with secure resource "B" exclusively.

At 604, it is determined whether a valid ticket exists. A ticket may be considered valid if it is associated with the requesting application 502 and with the requested secure resources 506. There may be additional criteria that need to be met before a ticket is considered to be valid. Some examples of additional criteria are discussed in further detail below.

In some embodiments, a security module 504 may determine the validity of a ticket in respect of a request for access to secured resources 506 (e.g. in the embodiments of system 500 shown in FIGS. 5a and 5b). In some embodiments, each of a plurality of security modules 504 may determine whether a ticket is valid in respect of the requested secure resources 506 over which that security module 504 controls access. For example, in the example shown in FIG. 5b, an application 502 may make a request for access to secure resources 506a and 506c. The application 502 may send this request to security modules 504a (which may control access to secure resource 506a) and to security module 504b (which may control access to secure resource 506c). Security module 504a may determine the validity of the ticket in respect of the secure resources 506 to which security module 504a is capable of granting access. For example, security module 504a may determine whether the ticket is associated with the requesting application 502 and with secure resource 506a. Similarly, security module 504b may determine whether the ticket is associated with the requesting application 502 and with secure resource 506c.

In some embodiments, an application 508 (which controls access to the requested secure resources 506) may determine the validity of a ticket (e.g. in the embodiment of system 500 shown in FIG. 5f).

In most cases, the result of a ticket validation will either be that the ticket is valid, and the application 502 is granted access to the requested secure resources 506 at 614, or else the ticket is invalid (or there is no ticket) and the method proceeds to 606.

At 606, a prompt is displayed on the device. In some embodiments, the prompt may ask for confirmation that the requesting application 502 is trusted. If the user responds to the prompt with an indication that the requesting application 502 is trusted, the security module 504 may generate a ticket at 612. Generating the ticket may comprise associating the ticket with both the requesting application 502 and the requested secure resources 506 (as discussed in more detail below). The prompt may identify the requesting application 502. In some embodiments, identifying the requesting application 502 within the prompt may not be necessary if the requesting application 502 is apparent (e.g. because it is clear from the user interface which requesting application 502 is active when the prompt is displayed).

In some embodiments, the prompt may request user authorization for the requesting application 502 to access the specific requested secure resource(s) 506. In some embodiments, the prompt may identify the requested secure resources 506. For example, the prompt may permit a user to identify one or more of the requested secure resource(s) 506 to authorize. In this way, a user may choose to authorize access to only a selected subset of the requested secure resources 506. If the user grants authorization for the requesting application 502 to access a subset of the requested secure resource 506, then security module 504 may, at 612, generate a ticket with respect to the selected subset of secure resources 506. Generating the ticket may comprise associating the ticket with both the requesting application 502 and each of the selected subset of secure resources 506.

In some embodiments, user authentication may be performed at 606. For example, the prompt may request a password or another form of verification such as biometric verification (e.g. fingerprint, palm scan, retinal scan etc.). Alternatively, the prompt may not require a password or other verification. In some cases, a valid password is one that is assigned by an administrator or user of the device. In some cases, a valid password is one that is specific to the requested secure resources 506. Where multiple secure resources 506 are being requested, the prompt may require multiple passwords. For example, there may be a different password associated with keys 506 in a keystore than with files 506 in a directory (and different keys or files may also have different passwords).

If the response to the prompt is that the application 502 is not authorized to access any of the requested resources 506, then the method ends at 610. However, if the response to the prompt is that the application 502 is authorized to access at least one of the requested resources 506, then the method proceeds to ticket generation at 612.

At 612, a ticket is generated by the security module 504. The security module 504 may generate a ticket that is associated with both the requested secure resource(s) 506, and the requesting application 502. For example, the security module 504 may generate a ticket comprising an application identifier and one or more secure resource identifiers. In some embodiments, there may be one secure resource identifier per secure resource 506. Alternatively or in addition, a plurality of secure resources 506 may be identified by a secure resource identifier (e.g. one identifier associated with a grouping of multiple keys 506 in a keystore).

In some embodiments, the security module 504 may generate a ticket comprising alphanumeric identifiers.

After the ticket is generated at 612, the security module 504 may return the ticket to the requesting application 502 at 613. The method may then end at 610 or the method may proceed to 614. At 614, the application 502 may be granted access to the secure resource(s) 506.

The application 502 may make subsequent requests for access to secure resources 506 (e.g. at 602). Each subsequent request may comprise the ticket generated by the security module 504. If the ticket is determined to be valid (e.g. at 604), then the application 502 may be granted access to the requested secure resources 506 (e.g. at 614) without having to prompt the user for authorization. A ticket may be reused by an application 502 for gaining access to secure resources 506, for as long as the ticket is valid. Accordingly, the use of tickets as a mechanism for controlling access to secure resources 506 may reduce the number of prompts to a user for authorization.

In some embodiments, a ticket may comprise application identifier(s) and secure resource identifier(s) both stored in an unsecure format. In some cases, however, this may not provide sufficient security. For example, unprotected data in a ticket may be susceptible to modification and forgery to the benefit of a hacker or a malicious application. Accordingly, in some embodiments, a ticket may comprise additional security mechanisms such as, for example, a message authentication code (MAC).

A MAC is a short piece of information (e.g. a string of characters) that is generated by a MAC algorithm. A MAC algorithm (such as HMAC, CBC-MAC, etc.) is sometimes referred to as a keyed cryptographic hash function. Typically, a MAC algorithm accepts as input a key and a message, and outputs a MAC. For example, a security module 504 may execute a MAC algorithm using (i) a key (e.g. a cryptographic key), (ii) an application identifier and (iii) secure resource identifiers, as inputs. The MAC may be applied to the contents of the entire ticket including ticket ID, app IDs, and resource IDs, for example. Ticket integrity is protected so that the ticket ID, app IDs, and resource IDs, and other inputs to the MAC cannot be changed by a rogue attacker. It will be understood that if only the application identifier and secure resource identifiers were provided as input to the algorithm without the key when generating a ticket, a rogue application would not be prevented from making unauthorized copies of the ticket. Typically, the key used with a MAC algorithm is a secret kept by the security module 504. For example, the security module 504 may be the only module with knowledge of the key.

The secret key used in a MAC algorithm cannot generally be deduced with knowledge of the message input and the resulting MAC. Accordingly, a ticket may comprise both the message input (e.g. an application identifier and one or more secure resource identifiers) as well as the MAC without compromising the secret key.

The MAC may protect the data integrity and authenticity of a ticket's contents. For example, when a security module 504 is presented with a ticket comprising a MAC (e.g. at 604), the security module 504 may repeat the MAC algorithm using the key (known to the security module 504) and the ticket contents (e.g. the application identifier and resource identifiers stored in the ticket) as inputs. The security module 504 may then compare the generated MAC with the MAC stored in the ticket. If the two MACs are a match, then they have been generated using the same key. So long as the secrecy of the key is not compromised, a matching MAC attests to the integrity and authenticity of the ticket and its contents. In the context of ticket validation (e.g. at 604), a ticket may be determined to be valid only if the ticket's MAC matches a MAC generated using a key and the ticket's contents.

In some embodiments, a security module 504 and an application 508 may have access to the same key. For example, a security module 504 may use the key to generate a MAC for including in a ticket. Subsequently, an application 508 may use the key to repeat the MAC algorithm and validate the ticket before granting access to the secure resources 506.

A key (e.g. for use with a MAC algorithm) may be stored in any suitable location. For example, a key may be stored in volatile memory, in non-volatile memory, or in hardware. In variant embodiments, one or more algorithms associated with ticket generation of verification may be implemented in hardware.

In some embodiments, the act of generating a MAC may comprise an API call to an external software module. For example, a security module 504 or an application 508 may generate a MAC by first obtaining a key, and then using the key with a MAC algorithm.

In some embodiments, a security module 504 or an application 508 may request a MAC from an external software module. For example, a hardware chip may store a key. The hardware chip may also be configured to receive a MAC request, where the request comprises ticket contents (e.g. application identifier(s) and secure resource identifier(s)) and possibly other attributes. The hardware chip may generate and/or provide a MAC as output in response to the request. This may provide additional security due to the relative inaccessibility of the key to a malicious application or hacker.

In variant embodiments, as an alternative to the use of MAC, tickets, or some of the data therein, may be digitally signed to achieve data origin authentication and data integrity. Digital signature algorithms such as RSA, DSA, and ECDSA may be employed. The private key used for signing may be stored in hardware or a smart card, for example. By employing digitally signed tickets, any application would be able to validate a ticket with the public key, but no unauthorized applications will be able to produce valid tickets using the private key. This may be implemented where multiple security modules are employed, and where some modules may verify tickets issued by other modules, for example. In these embodiments, determining the validity of a ticket, at 604, may additionally comprise verifying a digital signature associated with the ticket or data therein. If the digital signature fails, then the ticket is determined to be invalid.

In some embodiments, a ticket may be time-limited. A ticket may comprise either an issue date and duration, or an expiration date, to define a time period in which the ticket is valid. Determining the validity of a ticket (e.g. at 604) may additionally comprise determining whether the ticket is expired. If it is, then the ticket is determined to be invalid. In some embodiments, a security module 504 may include expiration data (e.g. the expiration date) or any other attributes as inputs to the MAC algorithm.

In some cases, malicious software and hackers may be able to circumvent the time limitation of a ticket. For example, an expired ticket may be artificially revived if a hacker is able to modify the system clock of the device such that the apparent system time is within the ticket's period of validity.

As an alternative or added security measure, each ticket may comprise a ticket identifier (e.g. a number or alphanumeric string of characters). As with application identifiers and secure resource identifiers, a ticket identifier may be unique, quasi-unique or unique in context. The ticket identifier may also be used as an input into a MAC algorithm substantially as described above. In some cases, a ticket identifier may permit a security module 504 or an application 508 to maintain a list of valid ticket identifiers, a list of revoked ticket identifiers, or combinations thereof. This may permit a time-limited ticket which has expired to be recorded in the list of revoked tickets (e.g. indexed by ticket identifier). Determining whether a ticket is valid (e.g. at 604) may comprise determining whether the ticket's ticket identifier is listed in a list of revoked ticket identifiers, or listed in a list of valid ticket identifiers, or both. For example, if the ticket's ticket identifier is in a list of revoked ticket identifiers, the ticket may be deemed invalid. This may defeat an attempt to revive an expired ticket by tampering with the system clock.

In some embodiments, the use of tickets comprising ticket identifiers may permit a security module 504, an application 508 or an external system administrator to monitor ticket usage (i.e. by ticket identifier). A ticket may be invalidated (e.g. its ticket identifier may be added to the list of revoked ticket identifiers) if that ticket's usage pattern raises security concerns (e.g. if the ticket is always being used when an untrusted third party application is active). Ticket usage patterns which may invalidate a ticket may be set out in a policy file stored at the device.

The use of tickets as a mechanism for controlling access to secure resources 506 may conveniently reduce the number of times a user is prompted for authorization. For example, after a ticket is generated for an application 502 (e.g. following a single prompt for authorization), that application 502 may reuse that ticket multiple times in subsequent requests. A request which comprises a valid ticket may be granted without further prompting the user.

In one aspect, the number of prompts for authorization can be further reduced by generating a ticket that is associated with more than one application 502, in response to an access request from one application 502. This may be especially convenient where multiple applications 502 desire access to a common set of secure resources 506 and where those applications 502 might have otherwise made independent requests for access to those secure resources 506 and caused the display of a prompt for user authorization.

For example, an application 502 may at 602 submit a request comprising a plurality of application identifiers. Some of the application identifiers may correspond to applications 502 other than the requesting application itself. In another example, an application 502 may at 602 submit a request comprising an application group identifier. The application group identifier may be associated with a plurality of applications 502.

At 606, the device may display one prompt for authorization covering all of the applications identified in the request (e.g. by a plurality of application identifiers or by at least one application group identifier). In some embodiments, the prompt may identify the requesting application 502 as well as each of the other applications 502 identified in the request. In variant embodiments, the prompt may only identify the requesting application 502.

If the user grants authorization at 608, then at 612 the security module 504 may generate a ticket associated with each of the applications 502 identified in the request. For example, the security module 504 may generate a ticket comprising an application identifier for each application 502 identified in the request. If the ticket comprises an application group identifier, then before generating the ticket, the security module 504 first determines an application identifier for each application 502 associated with the application group identifier.

In variant embodiments, the security module 504 may generate a ticket comprising the application group identifier. In this case, determining the validity of a ticket at 604 may comprise the security module 504 determining whether the requesting application 502 is associated with the application group identifier stored in the ticket.

In some embodiments, the prompt may allow the user to select which of the applications 502 to authorize. After the selection, security module 504 may, at 612, generate a ticket associated with the requested secure resources 506 and the selected applications 502.

Any of the applications 502 associated with the ticket may subsequently use the ticket to access the secure resources 506 associated with the ticket, even if the application 502 had not previously made its own request for access to those secure resources 506. In some embodiments, the application 502 that requested the ticket, and which was issued the ticket, may subsequently "share" the ticket with any of the applications 502 now associated with the ticket. Sharing the ticket with an application 502 may comprise storing a copy of the ticket in a memory store local to the application 502, or storing a pointer (i.e. memory location reference) to the ticket in a memory store local to the application 502, for example.

In some cases, allowing for requests to identify applications 502 other than the requesting application 502 may be considered a security concern if it can dupe a user into inadvertently authorizing a malicious application.

In variant embodiments, as an added measure of security, a request may only identify multiple applications 502 if all of the applications 502 are by the same developer. For example, the security module 504 may refuse to generate a ticket for multiple applications 502 unless all of the applications 502 are signed by a key associated with the same developer certificate. This may permit a user to base their decision to grant authorization at least partly on their trust in the developer of the requesting application 502. In some embodiments, the name of the developer may be displayed with the prompt for authorization.

Figure 6B:
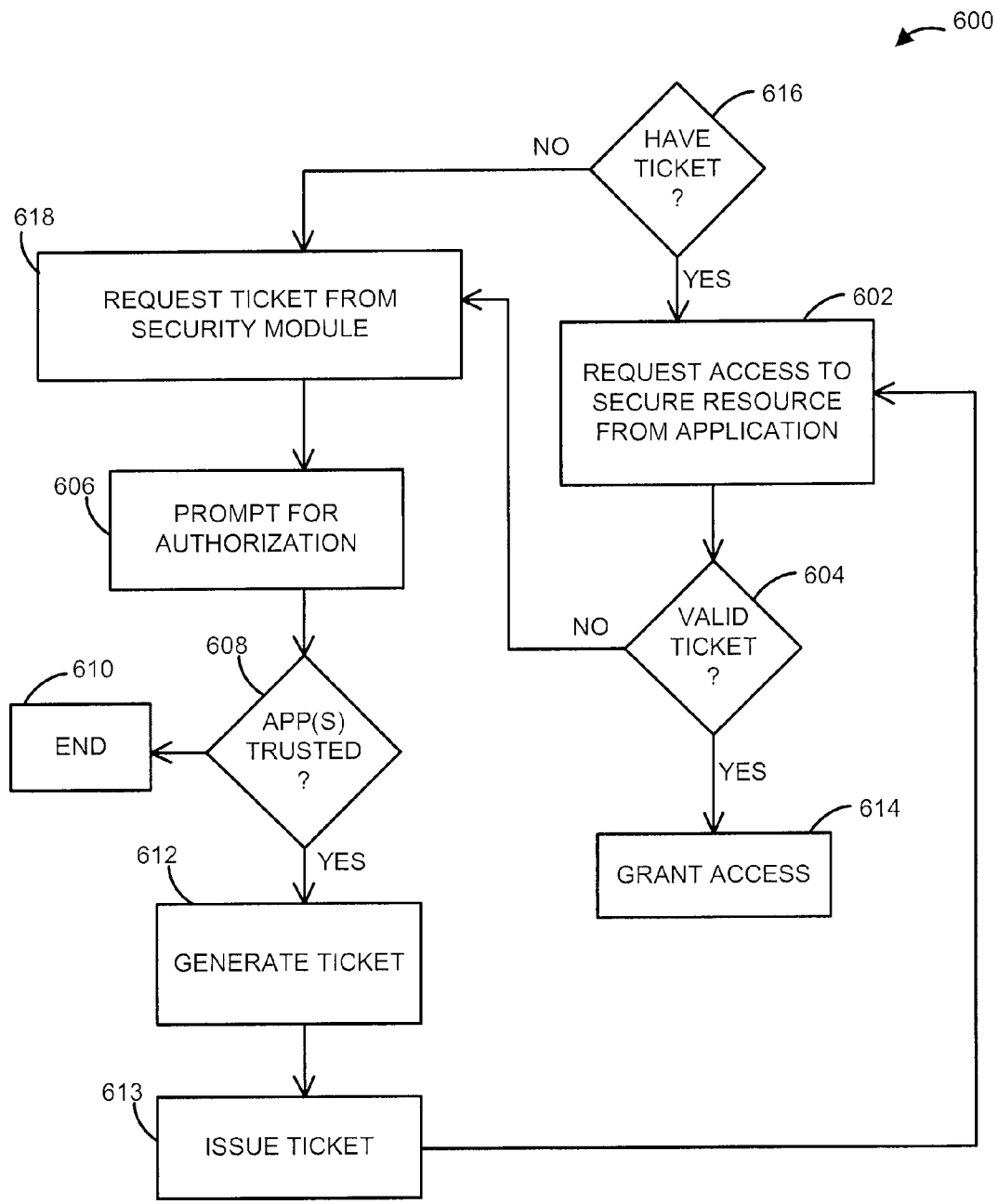
FIG. 6b is a flow diagram of a method of controlling access to secure resources on a device in accordance with at least one embodiment.

FIG. 6b is a flow diagram illustrating acts of a method 600 for controlling access to secure resources on a device. This example corresponds generally with the example of system 500 shown in FIG. 5f. At 616, an application 502 preparing to request access to a secure resource 506 determines whether it has a ticket associated with those secure resources 506. If the application 502 determines that it does not have a ticket associated with those secure resources 506, then at 618, the application 502 may send a request to a security module 504 requesting a ticket. If the application determines that it does have a ticket associated with those secure resources 506, then at 602, the application 502 may send a request to an application 508 requesting accessing to those secure resources 506.

In response to the ticket generation request at 618, the security module 504 may, at 606, display a prompt requesting authorization, as discussed in detail above. If the user authorizes the ticket generation at 608, then at 612 the security module 504 may generate a ticket and, at 613, issue the ticket to the requesting application 502. The application 502 may then submit a request to application 508 requesting access to the secure resources 506. The application 502 may include the newly generated ticket with the request. At 604, the application 508 may determine whether the ticket is valid (as discussed in detail above). If the application 508 determines that the ticket is valid, the application 508 may grant the application 502 access to the requested secure resources 506, at 614. If the application 508 determines that the ticket is not valid, the application 508 may indicate as such to the application 502 (e.g. return an error code indicating that the ticket is invalid). In response to the indication that the ticket is not valid, the application 502 may send a request for a ticket to security module 504.

A number of embodiments have been described herein. However, it will be understood by persons skilled in the art that other variants and modifications may be made without departing from the scope of the embodiments as defined in the claims appended hereto.

The invention claimed is:

1. A system for controlling access to a secure resource in a device, the device comprising a processor and a memory, wherein the processor is capable of:
  receiving a first request from a first application of a plurality of applications executable by the processor, the first request requesting access to the secure resource, and the first request identifying the plurality of applications;
  in response to the first request and to determining that each one of the plurality of applications is signed by a key associated with a same developer certificate, generating a first ticket associated with the secure resource and with each of the plurality of applications, wherein generating the first ticket comprises generating a message authentication code (MAC) for the first ticket using a key, an application identifier associated with the plurality of applications, and a secure resource identifier;
  storing the first ticket in the memory;
  receiving a second request from a second application of the plurality of applications, the second request requesting access to the secure resource, wherein a second ticket is not generated in response to the second request from the second application; and
  after receiving the second request, granting the second application access to the secure resource in response to determining that the first ticket associated with the secure resource exists and that the first ticket is associated with the second application.

2. The system of claim 1, wherein the processor receives a password before granting the second application access to the secure resource, via a user interface, in response to a prompt requesting the password.

3. The system of claim 2, wherein the processor is capable of displaying the prompt on a display communicably coupled to the processor.

4. The system of claim 1, wherein generating the first ticket further comprises signing the first ticket or data therein using a digital signature algorithm.

5. The system of claim 1, wherein the first ticket is time-limited and is configured to expire; and the processor determines that the first ticket has not expired before granting the second application access to the secure resource.

6. The system of claim 1, wherein the secure resource comprises at least one of: a key in a keystore, a data file, or a secure data folder.

7. The system of claim 1, wherein the device comprises a mobile device.

8. A method for controlling access to a secure resource in a device, the device comprising a processor and a memory, the method comprising:
  receiving a first request from a first application of a plurality of applications executable by the processor, the first request requesting access to the secure resource, and the first request identifying the plurality of applications;
  in response to the first request and to determining that each one of the plurality of applications is signed by a key associated with a same developer certificate, generating a first ticket associated with the secure resource and with each of the plurality of applications, wherein generating the first ticket comprises generating a message authentication code (MAC) for the first ticket using a key, an application identifier associated with the plurality of applications, and a secure resource identifier;
  storing the first ticket in the memory;
  receiving a second request from a second application of the plurality of applications, the second request requesting access to the secure resource, wherein a second ticket is not generated in response to the second request from the second application; and
  after receiving the second request, granting the second application access to the secure resource in response to determining that the first ticket associated with the secure resource exists and that the first ticket is associated with the second application.

9. The method of claim 8, further comprising receiving a password before granting the second application access to the secure resource, via a user interface, in response to a prompt requesting the password.

10. The method of claim 9, further comprising: displaying the prompt on a display communicably coupled to the processor.

11. The method of claim 8, wherein generating the first ticket further comprises signing the first ticket or data therein using a digital signature algorithm.

12. The method of claim 8, wherein the first ticket is time-limited and is configured to expire; and wherein the method further comprises determining that the first ticket has not expired before granting the second application access to the secure resource.

13. The method of claim 8, wherein the secure resource comprises at least one of: a key in a keystore, a data file, or a secure data folder.

14. The method of claim 8, wherein the device comprises a mobile device.

15. A non-transitory computer-readable information recording medium comprising instructions for controlling access to a secure resource in a device, the device comprising a processor and a memory, wherein the instructions when executed configure the processor to:
  receive a first request from a first application of a plurality of applications executable by the processor, the first request requesting access to the secure resource, and the first request identifying the plurality of applications;

in response to the first request and to determining that each one of the plurality of applications is signed by a key associated with a same developer certificate, generate a first ticket associated with the secure resource and with each of the plurality of applications, wherein generating the first ticket comprises generating a message authentication code (MAC) for the first ticket using a key, an application identifier associated with the plurality of applications, and a secure resource identifier;

store the first ticket in the memory;

receive a second request from a second application of the plurality of applications, the second request requesting access to the secure resource, wherein a second ticket is not generated in response to the second request from the second application; and after receiving the second request, grant the second application access to the secure resource in response to determining that the first ticket associated with the secure resource exists and that the first ticket is associated with the second application.

16. The medium of claim 15, wherein the device comprises a mobile device.

* * * * *